J. C. LANE.
Sextant and Quadrant.
No. 19,062.
Patented Jan. 5, 1858.
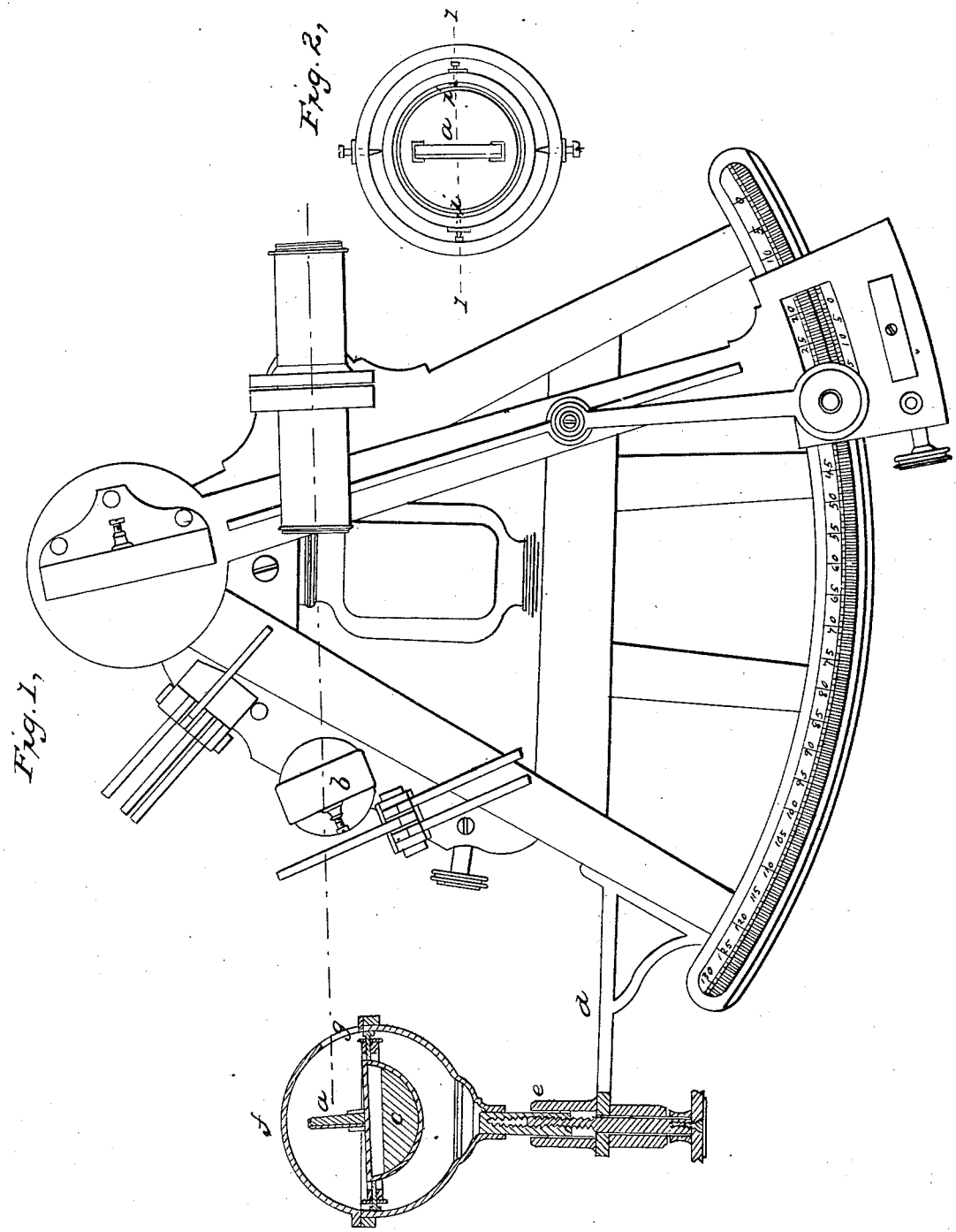

UNITED STATES PATENT OFFICE.

JAS. C. LANE, OF BROOKLYN, NEW YORK, ASSIGNOR TO HIMSELF, AND T. H. BARNES, OF NEW YORK, N. Y.

METHOD OF DETERMINING THE ARTIFICIAL HORIZON FOR QUADRANTS, &c.

Specification of Letters Patent No. 19,062, dated January 5, 1858.

*To all whom it may concern:*

Be it known that I, JAMES C. LANE, of the city of Brooklyn, county of Kings, and State of New York, civil engineer, have invented certain new and useful improvements in quadrants, sextants, or other instruments of a similar nature by which the altitude of the sun or any other object is measured; and I hereby declare that the following is a full, clear, and exact description thereof, reference being had to the accompanying drawings, making part of this specification, in which—

Figure 1 represents a face view of a sextant with the vertical mirror and its appurtenances shown in section in the line 1—2 of Fig. 2, and Fig. 2 a top view of the vertical mirror with the cap removed.

The letters of reference indicate the same parts in the different figures wherever they occur.

To a sextant of the usual construction with index glass, horizon glass and eyepiece I add a vertical mirror or reflecting surface ($a$) the plane of which is perpendicular to a continuation of the visual ray passing from the eye piece and intersecting a hair line ($b$) or its equivalent which is placed in the frame of the horizon glass or at any point between the mirror ($a$) and the eye where it can be seen by the eye with or without the aid of a lens. The hair line $b$, is placed at right angles to the said visual ray and perpendicular to the plane of the instrument. The vertical mirror $a$ is fixed upon and perpendicular to the level plane of a hemispherical cup $c$ which is loaded, and hung in gimbals or compass bearing supported, and attached to the sextant by an arm $d$, in such a manner that the mirror shall always maintain its vertical position. The cup $c$ is elevated or depressed by means of a screw $e$ working in a cylindrical brass nut.

A hinged cap or cover $f$, is placed over the mirror $a$, for the purpose of protecting the mirror from the action of the wind, an aperture ($g$) is cut therein to allow of the reflection of the hair line from the mirror. The plane of the mirror $a$ can be adjusted horizontally by the binding screws $i$ which hold it in position.

It is not necessary that the visual ray passing through the eye piece and the hair line should strike the center of the mirror $a$, the main points to be considered are that the mirror $a$, shall be in a convenient position to reflect the image of the hair line $b$ back in coincidence with the real hair line, and that the plane of the surface of the mirror $a$, shall be perpendicular to the visual ray which passes through the center of the eye piece and the hair line. The eye piece and hair line being fixed in such positions relative to each other and to the true horizon that a line drawn through their respective centers (the mirror $a$ being removed) shall touch the true or real horizon when visible, it is obvious that when the mirror $a$ is replaced in the manner and under the conditions described that a reflection of the hair line will be thrown back to the eye and that when the instrument is brought into such a position that the hair line coincides with or covers its reflection the horizontal line will be reëstablished, and may be reproduced with perfect accuracy whenever the horizon is obscured or obstructed, and as long as the parts remain in adjustment.

Having thus fully described my improvement what I claim as my invention, and desire to secure by Letters Patent is—

The combination of the eye piece, hair line, and vertical mirror, when attached to and used in connection with a sextant, quadrant, or similar instrument, in the manner and for the purpose set forth.

In testimony whereof I have hereunto signed my name.

JAS. C. LANE.

In the presence of—
CHAS. EVERETT,
G. B. TOWELS.